US009393930B2

(12) United States Patent
Ivenz et al.

(10) Patent No.: US 9,393,930 B2
(45) Date of Patent: Jul. 19, 2016

(54) PEDESTRIAN SAFETY DEVICE FOR A MOTOR VEHICLE

(71) Applicant: Bayerische Motoren Werke Aktiengesellschaft, Munich (DE)

(72) Inventors: Udo Ivenz, Gablingen (DE); Walter Meierhofer, Schmidham (DE); Ulrich Koestler, Hebertshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/472,593

(22) Filed: Aug. 29, 2014

(65) Prior Publication Data
US 2014/0367186 A1 Dec. 18, 2014

Related U.S. Application Data

(63) Continuation of application No. PCT/EP2013/053705, filed on Feb. 25, 2013.

(30) Foreign Application Priority Data

Mar. 5, 2012 (DE) .......................... 10 2012 203 409

(51) Int. Cl.
B60R 21/36 (2011.01)
B60R 21/38 (2011.01)
B60R 21/34 (2011.01)
B60R 21/2338 (2011.01)

(52) U.S. Cl.
CPC ................ *B60R 21/36* (2013.01); *B60R 21/38* (2013.01); *B60R 2021/23388* (2013.01); *B60R 2021/346* (2013.01)

(58) Field of Classification Search
CPC ........ B60R 21/34; B60R 21/36; B60R 21/38; B60R 2021/346; B60R 2021/23388
See application file for complete search history.

(56) References Cited

U.S. PATENT DOCUMENTS

| | | | | |
|---|---|---|---|---|
| 6,467,563 B1 * | 10/2002 | Ryan et al. | ..................... | 180/274 |
| 8,016,066 B1 * | 9/2011 | Boxey | ............................ | 180/271 |
| 8,985,257 B2 * | 3/2015 | Tanaka et al. | ................. | 180/274 |
| 2002/0074775 A1 | 6/2002 | Ryan | | |
| 2003/0178239 A1* | 9/2003 | Takimoto | ...................... | 180/274 |
| 2003/0213635 A1* | 11/2003 | Ryan et al. | ..................... | 180/274 |

(Continued)

FOREIGN PATENT DOCUMENTS

| | | |
|---|---|---|
| EP | 1 681 212 A2 | 7/2006 |
| WO | WO 02/079009 A1 | 10/2002 |

(Continued)

OTHER PUBLICATIONS

JPH07108903A. Published Apr. 25, 1995. Retrieved Apr. 6, 2015.*

(Continued)

*Primary Examiner* — Barry Gooden, Jr.
(74) *Attorney, Agent, or Firm* — Crowell & Moring LLP

(57) ABSTRACT

A pedestrian safety device for a motor vehicle includes an inflatable airbag that has a volume portion and a gas inlet channel connected with the volume portion. The volume portion is adapted in such a manner that in the inflated state, it extends over a windshield of the motor vehicle. The pedestrian safety device is configured in such a manner that the inflated volume portion is displaceable in an impact direction in the event of an impact of a person on the inflated volume portion.

13 Claims, 2 Drawing Sheets

(56) References Cited

U.S. PATENT DOCUMENTS

| | | | |
|---|---|---|---|
| 2003/0234525 A1* | 12/2003 | Igawa | 280/736 |
| 2004/0074690 A1* | 4/2004 | Sato et al. | 180/274 |
| 2005/0257979 A1* | 11/2005 | Hamada et al. | 180/274 |
| 2006/0151228 A1 | 7/2006 | Kalliske et al. | |
| 2006/0201731 A1* | 9/2006 | Nakamura | 180/274 |
| 2009/0102167 A1* | 4/2009 | Kitte et al. | 280/728.2 |
| 2009/0120708 A1* | 5/2009 | Takimoto | 180/274 |
| 2009/0127016 A1* | 5/2009 | Hayashi et al. | 180/274 |
| 2009/0289471 A1* | 11/2009 | Finney | 296/187.04 |
| 2010/0252350 A1* | 10/2010 | Hayashi et al. | 180/274 |
| 2013/0333972 A1* | 12/2013 | Rydsmo et al. | 180/274 |
| 2014/0027195 A1* | 1/2014 | Kalliske et al. | 180/271 |
| 2014/0291054 A1* | 10/2014 | Tanaka et al. | 180/274 |
| 2015/0090516 A1* | 4/2015 | Kitte et al. | 180/274 |

FOREIGN PATENT DOCUMENTS

| | | |
|---|---|---|
| WO | WO 03/059700 A1 | 7/2003 |
| WO | WO 2005/023605 A1 | 3/2005 |
| WO | WO 2011/102075 A1 | 8/2011 |

OTHER PUBLICATIONS

Machine translation of JPH07108903A. Retrieved Apr. 6, 2015.*
WO 2013/131771 A1. Koestler, Ulrich Published Sep. 12, 2013. Retrieved Apr. 6, 2015.*
Machine translation of JP 07-108903. Retrieved on Oct. 15, 2015.*
Corresponding International Search Report dated Jul. 18, 2013 with English Translation (ten (10) pages).

* cited by examiner

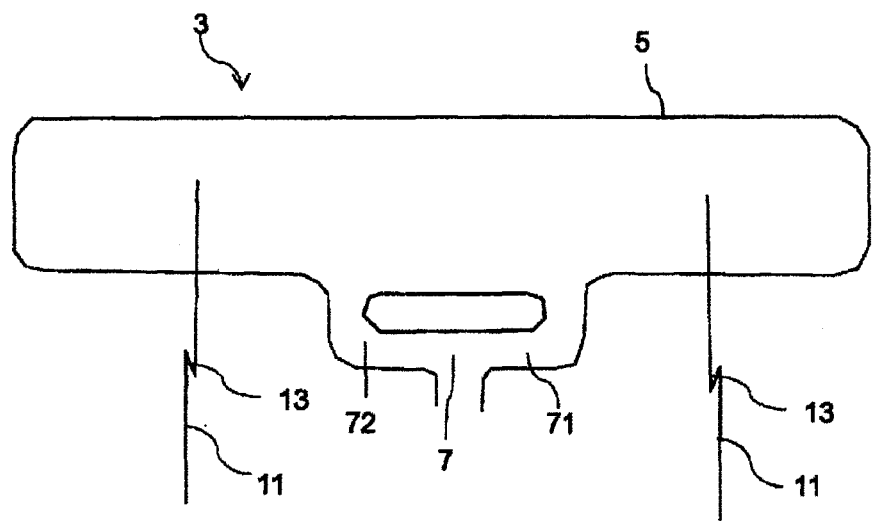 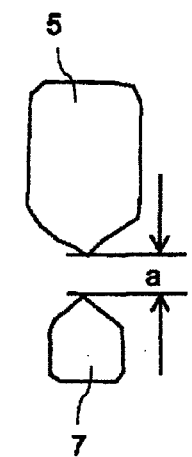
Fig. 3a    Fig. 3b
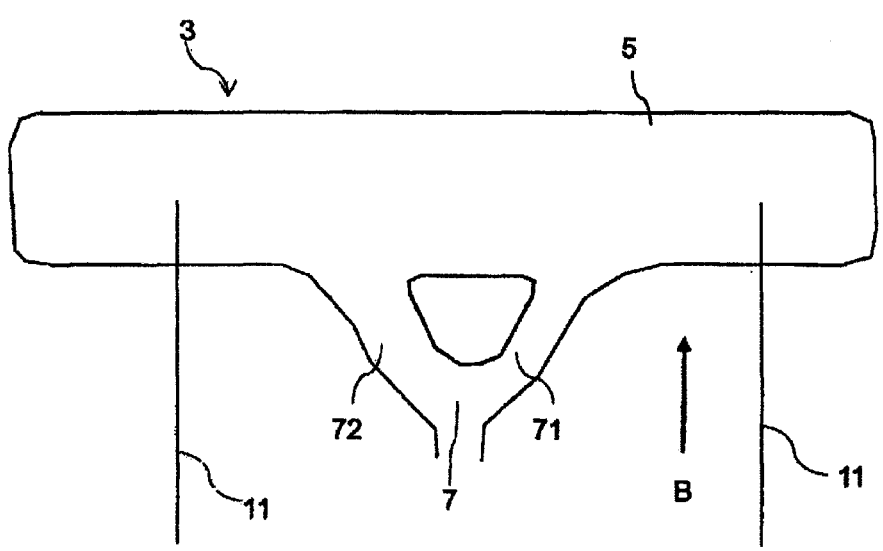 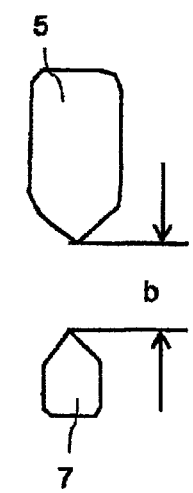
Fig. 4a    Fig. 4b

PEDESTRIAN SAFETY DEVICE FOR A MOTOR VEHICLE

CROSS REFERENCE TO RELATED APPLICATIONS

This application is a continuation of PCT International Application No. PCT/EP2013/053705, filed Feb. 25, 2013, which claims priority under 35 U.S.C. §119 from German Patent Application No. 10 2012 203 409.9, filed Mar. 5, 2012, the entire disclosures of which are herein expressly incorporated by reference.

BACKGROUND AND SUMMARY OF THE INVENTION

The present invention relates to a pedestrian safety device for a motor vehicle, wherein an inflatable airbag extends over a windshield in the inflated state so that an impact of a person on the windshield is cushioned by the airbag.

It is known to provide an airbag in the region of a windshield for pedestrian protection. In particular, it has previously been proposed to accommodate an airbag in the region of a cowl or back end of a hood. In the event of a collision of the vehicle with a pedestrian, the airbag is activated, i.e. inflated, wherein the inflated airbag then extends at least partially over a windshield.

It is an object of the present invention to create a pedestrian safety device for a motor vehicle, having an inflatable airbag, which can better weaken the impact of a person.

This and other objects are achieved by means of a pedestrian safety device according to the invention. In particular, a pedestrian safety device for a motor vehicle has an inflatable airbag that has a volume portion and a gas inlet channel connected with the volume portion. The volume portion is adapted in such a manner that in the inflated state, it extends over a windshield or front window of the motor vehicle. Furthermore, the pedestrian safety device according to the present invention is configured in such a manner that the inflated volume portion is displaceable in an impact direction in the event of an impact (collision) of a person on the inflated volume portion.

The gas inlet channel is preferably a channel that is disposed between a gas generator and the volume portion. The volume portion in turn is part of the airbag, which forms a sufficient protective cushion for the person in the event of an impact on the windshield, in the inflated state.

When a person or a pedestrian, particularly the head of a person, becomes immersed in the volume portion, the volume portion in a sense forms a shape-fit connection with the head, so that the head or another body part of the person can move, relative to the volume portion, only with relatively great difficulty. For this reason, the inventors have proposed, according to the present invention, that the volume portion itself is displaceable, with reference to the windshield, in the impact direction. In other words, the characteristics of the present invention ensure that since it is already difficult for the person to slide on the volume portion, i.e. relative to the volume portion, the person can slide in an impact direction together with the volume portion.

The volume portion can be configured in such a manner that it extends over the entire width of the windshield, i.e. in the y direction of the motor vehicle coordinate system, and over a left and right A pillar of a body of the motor vehicle. In particular, the volume portion can be configured in a U-shape, in such a manner that a coverage region on the A pillars and on the outer edges of the windshield is longer, i.e. longer in the x and z direction of the motor vehicle coordinate system, than in a center region of the windshield. The x direction runs along the center axis of the motor vehicle, the y direction runs along the transverse axis of the motor vehicle, and the z direction runs along the vertical axis of the motor vehicle.

Such a U-shaped volume portion has the advantage that it covers the A pillars, which would form an overly hard resistance for the impacting person over their entire length. In other words, an HIC value is too high over the entire length of the A pillars, so that the A pillars are covered by the volume portion over a large region in the xz direction. The windshield, on the other hand, possibly has very different HIC values at different locations from one another. The abbreviation HIC stands for Head Injury Criterion and can also be referred to as a head stress value. An HIC value of the windshield can be sufficient in its center region, by means of breaking of the windshield caused by the impacting person, so that only a lower region of the windshield and possibly outer edge regions of the windshield must be covered by the volume portion for pedestrian protection. This has the advantage that since the windshield is not completely covered, a field of view of the driver of the motor vehicle is not completely covered, and the driver of the motor vehicle has a larger viewing field available.

Preferably, the configuration of the pedestrian safety device described above make use of at least the gas inlet channel for the displacement of the volume portion. The gas inlet channel accordingly has such a construction that the volume portion is displaceable relative to the windshield.

In particular, in the pedestrian safety device according to the present invention, the gas inlet channel can have such a geometry that displacement of the volume portion upon the impact of the person is made possible. In other words, the gas inlet channel, as a connection between the gas generator and the volume portion, therefore permits movement of the volume portion along the windshield, in the impact direction.

According to a further development of the pedestrian safety device according to the present invention, in this connection the gas inlet channel is geometrically configured in such a manner that it branches into two gas inlet channels, in a U-shape. In particular, a beginning of the gas inlet channel makes a transition into a U-shaped gas inlet channel, the two ends of which (the shanks of the U) are then connected with the volume portion both mechanically and in terms of flow mechanics.

This U-shaped geometry of the gas inlet channel allows displacement of the volume portion in that the gas inlet channel is changed from the U-shaped geometry to a V-shaped geometry, as the result of the force of the person acting in the impact direction.

Alternatively or additionally, in the pedestrian safety device according to the present invention, the gas inlet channel can also be configured to be elastic or extendable in some other manner, for example by way of tear seams. Movement or displacement of the volume portion in the impact direction is also made possible in this way.

Additionally or alternatively, in the pedestrian safety device according to the present invention, the device can be formed by at least one extendable and/or separable safety strap that is configured in such a manner that when the volume portion is inflated, the safety strap holds the volume portion in a first position, and is extendable and/or separable under the stress caused by an impacting person, so that the volume portion can be displaced to at least a second position.

In this way, the airbag at first remains in a first position while it is inflated. However, if a person impacts on the volume portion, the safety strap is extended or separated, so that displacement of the volume portion is permitted. In this way, stress on the person when impacting on the volume portion is reduced, because the volume portion can be moved over a certain distance, together with the person.

For example, two safety straps can be provided, one of which is attached to a left outer region of the volume portion, and the other of which is attached to a right outer region of the body part.

In particular, in a pedestrian safety device according to the present invention, the safety strap can have a tear seam that is configured in such a manner that the tear seam can tear under the stress caused by the impacting person, so that the safety strap can be extended. In other words, the tear seam can separate or tear under stress.

The tear seam can be configured in such a manner, for example, that it shortens the safety strap in its actual length. For example, the safety strap can be sewn in the form of a Z fold. If the seam tears due to the stress caused by the person, the Z fold unfolds, thereby lengthening the safety strap, and thereby allowing movement or displacement of the volume portion.

A different type of folding/shortening of the safety strap can also be provided. For example, the folding/shortening of the safety strap can be formed by a loop that allows lengthening of the safety strap when the tear seam is opened.

Alternatively to a tear seam, the safety strap can have a glued connection that releases under stress. The glued connection can also be configured in combination with a Z fold of the safety strap or with a different type of folding/shortening of the safety strap.

Likewise, a tear seam and a releasable glued connection can be combined with one another.

In the case of a pedestrian safety device according to the present invention, with a separable safety strap, a connection of the safety strap with the volume portion or a body-side connection of the safety strap can be separable, in other words can have a planned separating point (predetermined separating or breaking point), so that the safety strap can no longer restrict displacement of the volume portion. Alternatively or additionally, the separable safety strap can also have a planned separating point within the safety strap, at which the safety strap can be intentionally separated or torn into two halves, under stress.

According to a further development of the pedestrian safety device of the present invention, the device is configured at least with friction-reducing measures, which are provided on a side of the volume portion facing the windshield, so that displaceability of the volume portion on the windshield is promoted.

The term friction-reducing measures refers to at least one feature that reduces a friction value between the volume portion and the windshield. In this way, the volume portion can slide on the windshield more easily, so that it can be displaced more easily and therefore reduce stress on the impacting person.

The friction-reducing measures can be configured, for example, by a slide-capable coating of the volume portion and/or by a slide element additionally affixed on the volume portion.

Preferably, in the pedestrian safety device according to the present invention, the volume portion and the gas inflow part are configured from a woven fabric.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3a schematically illustrates the pedestrian safety device according to the exemplary embodiment of the present invention, in a top view, in accordance with the state shown in FIG. 1.

FIG. 3b schematically illustrates the pedestrian safety device according to the exemplary embodiment of the present invention, in a sectional side view, in accordance with the state shown in FIG. 1.

FIG. 4a schematically illustrates the pedestrian safety device according to the exemplary embodiment of the present invention, in a top view, in accordance with the state shown in FIG. 2.

FIG. 4b schematically illustrates the pedestrian safety device according to the exemplary embodiment of the present invention, in a sectional side view, in accordance with the state shown in FIG. 2.

DETAILED DESCRIPTION OF THE DRAWINGS

Figure 1:
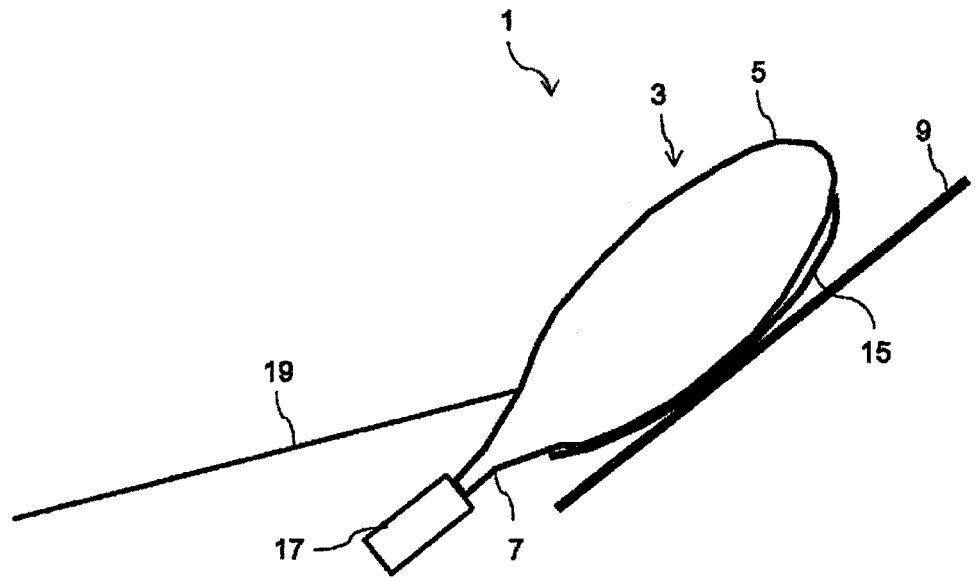
FIG. 1 schematically illustrates a pedestrian safety device according to an exemplary embodiment of the present invention, in a side view, with an airbag having been activated.

FIG. 1 schematically shows a pedestrian safety device 1 for a motor vehicle, having an inflatable airbag 3, in a side view. In particular, the airbag 3 is shown in an inflated state. The airbag 3 has a volume portion 5 and a gas inlet channel 7. The volume portion 5 and the gas inlet channel 7 are connected with one another and transition into one another. Furthermore, the gas inlet channel 7 is connected with a gas generator 17. The volume portion 5 can be filled with gas from the gas generator 17 by way of the gas inlet channel 7. In the inflated state of the airbag 3, as shown, the volume portion 5 extends over a windshield 9 and over A pillars of the motor vehicle, not shown. In particular, the volume portion 5 extends over at least a lower region of the windshield 9, and essentially over an entire width of the windshield 9. Furthermore, the volume portion 5 has a slide layer 15 on its side facing the windshield 9. The slide layer 15 facilitates displacement of the volume portion 5 on the windshield 9, and thereby represents a friction reducing measure according to the invention.

In particular, in FIG. 3a, the volume portion 5, with which the gas inlet channel 7 is connected, is shown schematically, in a top view. The gas inlet channel 7 branches into a U-shape having two shanks 71 and 72. The two shanks 71 and 72 are connected with the volume portion 5 at their respective ends. Furthermore, two safety straps 11 are shown in FIG. 3, which extend to the left and to the right of the gas inlet channel 7 and are attached on the body or vehicle side, for one thing, and attached to the volume portion 5, for another. The safety straps 11 each have a Z-shaped tear seam 13. In this way, the safety straps 11 are shortened at one point by a Z-shaped fold, where the Z-shaped fold is fixed in place with a seam. The safety straps 11 can also have multiple such tear seams, and can be folded in a different manner that shortens the safety straps. Alternatively, the safety straps 11 can also be shortened by way of a glued connection, and thereby can be extendable during operation. Likewise, the safety straps 11 can have a planned separating point, which allows separation of the safety straps 11 into two parts, in each instance.

The volume portion 5, contrary to the representation in FIG. 3a, can also have a different shape. For example, the volume portion can have extended sections at its left and its right end, which extend over the A pillar and/or over the outer edge of the windshield 9.

Furthermore, in FIG. 3b, a view of a section through a center—along an xz plane of the motor vehicle coordinate system (x is the longitudinal axis of the motor vehicle and z is the vertical axis of the motor vehicle)—of the gas inlet channel 7 and of the volume portion 5 is shown schematically.

The safety straps 11, just like the slide layer 15, facilitate making it possible for the inflated volume portion 5 to be displaceable in an impact direction in the event of an impact of a person on the inflated volume portion 5.

Figure 2:
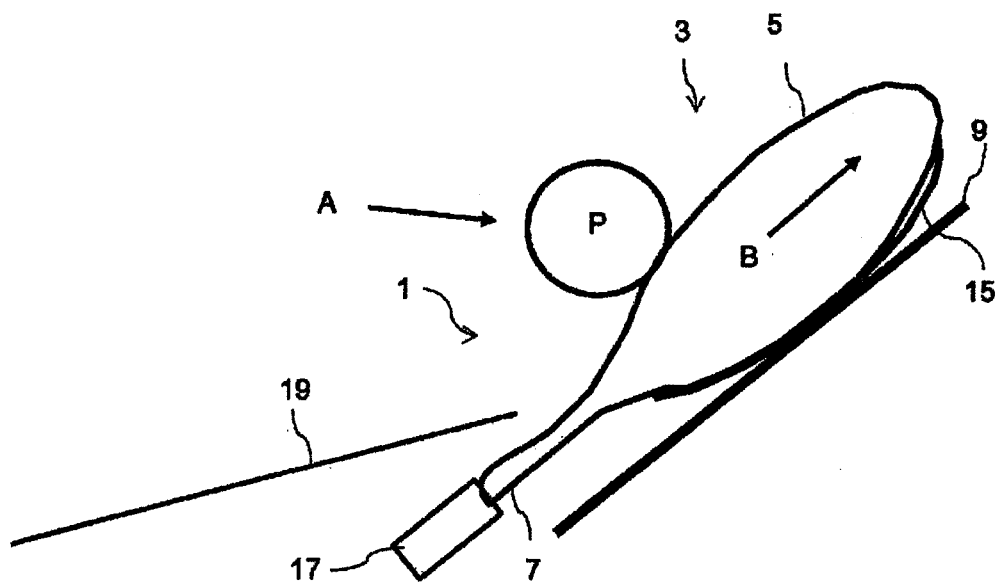
FIG. 2 schematically illustrates the pedestrian safety device according to the exemplary embodiment of the present invention, in a side view, while a pedestrian collides with the airbag.

This shall now be explained, in particular, using FIGS. 2, 4a, and 4b.

FIG. 2 schematically shows a side view of the inflated airbag 3, which is situated in a displaced state. A head of a person P is represented with a circle, and is particularly shown in the state in which the head P has collided with the volume portion 5 of the airbag 3, where the head P has come from the direction of the arrow A—the impact direction. The volume portion 5 has been displaced along the windshield 9, in the direction of the arrow B, by the impact of the head P. The displacement of the volume portion 5 in the direction of the arrow B represents a displacement in the impact direction A, at least in part. In other words, the displacement direction B also has the impact direction A as a vector component.

The power of the impact of the person P upon the volume portion 5 by way of the hood 19 causes a force that results and acts on the volume portion 5, in the direction of the arrow B, in other words in the direction of the upper end of the windshield 9.

This leads to the consequence, as can be seen in FIG. 4a, that the tear seams 13 of the safety straps 11 have been torn open, and the Z fold of the safety straps 11 has been unfolded, so that in total, a lengthening of the safety straps 11 has taken place. In this way, the volume portion 5 was able to move along the windshield 9 or was able to be displaced along the windshield 9.

This displacement is furthermore promoted, according to the present exemplary embodiment, in that the gas inlet channel 7 is configured in a U-shape and is stretched, by the acting force of the person P, in such a manner that the gas inlet channel 7 has a V-shaped configuration in this stretched state, as is particularly evident also from FIG. 4a. In this way, the U-shaped gas inlet channel 7 facilitates making possible the displacement of the inflated volume portion 5 in the impact direction, in the event of the impact of the person P on the inflated volume portion 5.

In addition, displacement is promoted by the friction-reducing slide layer 15.

Furthermore, analogous to FIG. 3b, in FIG. 4b a section through a center of the gas inlet channel 7 and of the volume portion 5 in the state of FIG. 4a is shown schematically.

As can be seen in comparison with the state in FIG. 3b, the distance b between the beginning of the gas inlet channel 7 and the volume portion 5 after impact of the person P is greater in comparison with the distance a between the beginning of the gas inlet channel 7 and the volume portion 5 before impact of the person P. The volume portion 5 has been displaced by the impact of the person P, tearing of the Z seams 13, stretching of the gas inlet channel 7, and sliding of the volume portion 5 on the windshield 9.

All three measures described according to the exemplary embodiment, (the safety straps 11 with tear seam 13, the geometry of the gas inlet channel 7, and the slide layer 15) can also be configured independently of one another.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pedestrian safety device for a motor vehicle, comprising:
   an inflatable airbag comprising a volume portion and a gas inlet channel, the gas inlet channel being connected with the volume portion;
   at least one extendable or separable safety strap configured to allow a displacement of an inflated volume portion in an impact direction, the at least one extendable or separable safety strap holding the volume portion in a first position and being extendable or separable under stress caused by a collision of a person so that the the volume portion is displaceable to at least a second position, wherein
   the volume portion is adapted such that in an inflated state the volume portion extends over a windshield of the motor vehicle, and
   the pedestrian safety device is configured to allow the volume portion, when inflated, to be displaceable in an impact direction in an event of the collision of the person with the inflated volume portion.

2. The pedestrian safety device according to claim 1, wherein the gas inlet channel is configured to provide for the displacement of the inflated volume portion in the impact direction.

3. The pedestrian safety device according to claim 2, wherein the gas inlet channel is elastically configured.

4. The pedestrian safety device according to claim 2, wherein the gas inlet channel has a geometrical arrangement permitting the displacement of the volume portion upon the collision of the person.

5. The pedestrian safety device according to claim 4, wherein the gas inlet channel is elastically configured.

6. The pedestrian safety device according to claim 4, wherein the gas inlet channel branches into two gas inlet channels forming a U-shape.

7. The pedestrian safety device according to claim 6, wherein the gas inlet channel is elastically configured.

8. The pedestrian safety device according to claim 1, wherein the safety strap has a tear seam or a releasable glued connection, the tear seam or the releasable glued connection being configured so as to tear or release under the stress caused by the collision of the person so that the safety strap can be extended.

9. The pedestrian safety device according to claim 8, further comprising a friction-reducing system provided on a side of the volume portion facing the windshield to facilitate the displacement of the volume portion on the windshield.

10. The pedestrian safety device according to claim 1, further comprising a friction-reducing system provided on a side of the volume portion facing the windshield to facilitate the displacement of the volume portion on the windshield.

11. The pedestrian safety device according to claim 10, wherein the friction-reducing system comprises a friction-reducing coating on the volume portion or a slide material layer fixed on the volume portion.

12. A pedestrian safety device for a motor vehicle having a windshield, comprising:

an inflatable airbag comprising a volume portion and a gas inlet channel connected with the volume portion, the volume portion being adapted to extend over the windshield of the motor vehicle in an inflated state;

at least one extendable or separable safety strap configured to allow a displacement of the inflated volume portion in an impact direction, the at least one extendable or separable safety strap holding the volume portion in a first position and being extendable or separable under stress caused by a collision of a person so that the volume portion is displaceable to at least a second position; and means for facilitating the displacement of the inflated volume portion upward in an impact direction along the windshield when the person collides with the inflated volume portion.

13. A motor vehicle, comprising:

a pedestrian safety device for the motor vehicle, the pedestrian safety device including, an inflatable airbag having a volume portion and a gas inlet channel, the gas-inlet channel being connected with the volume portion;

at least one extendable or separable safety strap configured to allow displacement of an inflated volume portion in an impact direction, the at least one extendable or separable safety strap holding the volume portion in a first position and being extendable or separable under stress caused by collision of a person so that the volume portion is displaceable to at least a second position, wherein the volume portion is adapted such that in an inflated state the volume portion extends over a windshield of the motor vehicle, and the pedestrian safety device is configured to allow the volume portion, when inflated, to be displaceable in the impact direction in an event of the collision of the person with the inflated volume portion.

* * * * *